(12) United States Patent
Cha et al.

(10) Patent No.: US 10,261,566 B2
(45) Date of Patent: Apr. 16, 2019

(54) REMOTE CONTROL APPARATUS AND METHOD FOR CONTROLLING POWER

(71) Applicant: SAMSUNG ELECTRONICS CO., LTD., Suwon (KR)

(72) Inventors: Tae-hwan Cha, Yongin (KR); Jae-cheol Kim, Suwon (KR); Tae-je Park, Suwon (KR); Cheon-seong Lee, Yongin (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 625 days.

(21) Appl. No.: 14/132,136

(22) Filed: Dec. 18, 2013

(65) Prior Publication Data

US 2014/0195235 A1 Jul. 10, 2014

(30) Foreign Application Priority Data

Jan. 7, 2013 (KR) .................. 10-2013-0001726

(51) Int. Cl.
*G10L 15/22* (2006.01)
*G06F 1/3231* (2019.01)
*G06F 1/3234* (2019.01)
*G10L 15/00* (2013.01)
*H04N 21/443* (2011.01)
*G06F 3/16* (2006.01)

(52) U.S. Cl.
CPC ............ *G06F 1/3231* (2013.01); *G06F 1/325* (2013.01); *G06F 1/3259* (2013.01); *G06F 3/167* (2013.01); *G10L 15/00* (2013.01); *H04N 21/4436* (2013.01); *Y02D 10/155* (2018.01); *Y02D 10/173* (2018.01); *Y02D 50/20* (2018.01)

(58) Field of Classification Search
CPC ...................................................... G10L 15/22
See application file for complete search history.

(56) References Cited

U.S. PATENT DOCUMENTS 4,506,377 A * 3/1985 Kishi .................. B60R 16/0373
381/110
4,827,520 A * 5/1989 Zeinstra .............. B60R 16/0373
701/1

(Continued)

FOREIGN PATENT DOCUMENTS

KR 10-2009-0107365 10/2009

OTHER PUBLICATIONS

Korean Office Action dated Aug. 16, 2016 in corresponding Korean Patent Application No. 10-2013-0001726.

*Primary Examiner* — Jialong He
(74) *Attorney, Agent, or Firm* — Staas & Halsey LLP (57) ABSTRACT

A remote controller and a power control method are disclosed. The remote controller includes a voice recognizer a voice recognizer configured to recognize a voice utterance, a user interface configured to receive a user command; and a controller configured to, when a user command is input through the user interface to enter a voice recognition mode, convert a stand-by mode into an active mode, and convert the active mode into the stand-by mode depending on whether the utterance is recognized within a preset critical time. Accordingly, the remote controller, enabling an operation mode of a voice recognition module which recognizes a user voice utterance to be maintained as an active mode, can reduce power unnecessarily consumed.

7 Claims, 7 Drawing Sheets

(56) References Cited

U.S. PATENT DOCUMENTS

| | | | | |
|---|---|---|---|---|
| 4,959,864 A * | 9/1990 | Van Nes | G10L 15/22 | 704/251 |
| 5,199,080 A * | 3/1993 | Kimura | H03J 1/0025 | 381/110 |
| 5,226,090 A * | 7/1993 | Kimura | H04B 1/46 | 348/734 |
| 5,983,186 A * | 11/1999 | Miyazawa | G10L 15/26 | 704/233 |
| 6,188,986 B1 * | 2/2001 | Matulich | G10L 15/26 | 704/275 |
| 6,397,186 B1 * | 5/2002 | Bush | G10L 15/26 | 704/272 |
| 6,539,358 B1 * | 3/2003 | Coon | B60R 11/0241 | 704/251 |
| 6,617,975 B1 * | 9/2003 | Burgess | G07C 9/00182 | 340/539.11 |
| 6,665,801 B1 * | 12/2003 | Weiss | G06F 1/266 | 713/300 |
| 7,720,683 B1 * | 5/2010 | Vermeulen | G10L 15/22 | 704/235 |
| 8,150,700 B2 | 4/2012 | Shin et al. | | |
| 8,271,287 B1 * | 9/2012 | Kermani | H04N 21/42203 | 704/275 |
| 8,560,324 B2 | 10/2013 | Shin et al. | | |
| 8,788,271 B2 * | 7/2014 | James | G06F 9/4443 | 704/270 |
| 2002/0010588 A1 * | 1/2002 | Fujimori | G06F 9/4443 | 704/275 |
| 2002/0024538 A1 * | 2/2002 | Bandaru | G06F 17/30265 | 715/764 |
| 2002/0126035 A1 * | 9/2002 | Hou | G08C 23/04 | 341/176 |
| 2003/0001820 A1 * | 1/2003 | Hou | G06F 3/021 | 345/168 |
| 2003/0101053 A1 * | 5/2003 | Washio | G10L 15/183 | 704/226 |
| 2003/0105637 A1 * | 6/2003 | Rodriguez | G06F 17/2735 | 704/270 |
| 2004/0128137 A1 * | 7/2004 | Bush | G10L 15/26 | 704/275 |
| 2004/0153321 A1 * | 8/2004 | Chung | G10L 15/22 | 704/251 |
| 2004/0243419 A1 * | 12/2004 | Wang | G10L 15/1822 | 704/277 |
| 2005/0096905 A1 * | 5/2005 | Steinbiss | G10L 15/28 | 704/233 |
| 2005/0104853 A1 * | 5/2005 | Sitalasai | G06F 1/3203 | 345/163 |
| 2005/0114132 A1 * | 5/2005 | Hsu | G10L 15/22 | 704/251 |
| 2005/0165609 A1 * | 7/2005 | Zuberec | G10L 15/22 | 704/270 |
| 2005/0182631 A1 * | 8/2005 | Lee | G10L 15/22 | 704/275 |
| 2006/0085199 A1 * | 4/2006 | Jain | G10L 15/26 | 704/275 |
| 2006/0217976 A1 * | 9/2006 | Gao | G10L 25/78 | 704/214 |
| 2007/0049363 A1 * | 3/2007 | Green | G05B 19/042 | 455/575.2 |
| 2007/0176752 A1 * | 8/2007 | Mickle | G06K 19/0701 | 340/10.33 |
| 2007/0281761 A1 * | 12/2007 | Kim | H04M 1/6008 | 455/575.2 |
| 2009/0043580 A1 * | 2/2009 | Mozer | G10L 13/00 | 704/251 |
| 2009/0254351 A1 | 10/2009 | Shin et al. | | |
| 2009/0316054 A1 * | 12/2009 | Bailey | G08C 19/02 | 348/734 |
| 2009/0320076 A1 * | 12/2009 | Chang | G10L 15/22 | 725/60 |
| 2010/0008117 A1 * | 1/2010 | Luthi | H02J 9/005 | 363/126 |
| 2011/0202355 A1 * | 8/2011 | Grill | G10L 19/18 | 704/500 |
| 2012/0130712 A1 | 5/2012 | Shin et al. | | |
| 2012/0215537 A1 * | 8/2012 | Igarashi | G06F 3/167 | 704/249 |
| 2013/0035942 A1 * | 2/2013 | Kim | G06F 3/167 | 704/275 |
| 2013/0080178 A1 * | 3/2013 | Kang | G06F 3/167 | 704/275 |
| 2013/0289994 A1 * | 10/2013 | Newman | G10L 15/22 | 704/254 |
| 2014/0085221 A1 * | 3/2014 | Kim | G06F 3/016 | 345/173 |
| 2014/0149118 A1 * | 5/2014 | Lee | G10L 15/22 | 704/251 |
| 2014/0156269 A1 * | 6/2014 | Lee | G06F 1/3206 | 704/231 |
| 2014/0195235 A1 * | 7/2014 | Cha | G06F 1/3231 | 704/246 |
| 2014/0372115 A1 * | 12/2014 | LeBeau | H04M 1/72552 | 704/235 |

* cited by examiner

REMOTE CONTROL APPARATUS AND
METHOD FOR CONTROLLING POWER

CROSS-REFERENCE TO RELATED
APPLICATION(S)

This application claims priority from Korean Patent Application No. 10-2013-0001726, filed on Jan. 7, 2013, in the Korean Intellectual Property Office, the disclosure of which is incorporated herein by reference in its entirety.

BACKGROUND

1. Field

Aspects of the exemplary embodiments relate to a remote control apparatus and a method for controlling power and, more particularly, to a remote control apparatus capable of voice recognition and a method for controlling power.

2. Description of the Related Art

Recently, a dialogue system is designed to recognize a user utterance voice or voice utterance, provide information suitable for the purposes of a user based on the recognized utterance voice or voice utterance, or control a function of a display apparatus. In particular, when a user utterance is recognized thorough a remote controller, the remote controller keeps activating a voice recognition module which recognizes a user utterance. Moreover, a remote controller activates a communication module, such as Bluetooth, in order to transmit a user utterance recognized through a voice recognition module to a display apparatus.

The prior remote controller keeps an operation module of a voice recognition module and a communication module in an active mode in order to recognize a user utterance and transmit the recognized utterance to a display apparatus. That is, a remote controller, even when a user utterance is not recognized, keeps an operation mode of a voice recognition module and a communication module as an active mode. As such, an operation mode of a voice recognition module and a communication module is kept in an active mode, and thus life of a battery supplying power to a remote controller is shortened. Consequently, usable life of a remote controller is decreased.

SUMMARY

Additional aspects and/or advantages will be set forth in part in the description which follows and, in part, will be apparent from the description, or may be learned by practice of the embodiments.

An aspect of the exemplary embodiments is designed in accordance with the above-described necessities and is purposed to provide a remote controller which prevents shortening of a usable life of a battery of a remote controller which recognizes a user voice utterance.

According to an exemplary embodiment, a remote controller includes a voice recognizer configured to recognize a utterance, a user interface configured to receive a user command, and a controller configured to, when a user command is input through the user interface to enter a voice recognition mode, convert a stand-by mode into an active mode, and convert the active mode into the stand-by mode depending on whether the utterance is recognized within a preset critical time.

The remote controller further includes a communication unit configured to transmit voice information on the recognized utterance by communicating with a display apparatus, wherein the controller, when the user command is input, may convert an operation mode of the voice recognizer and the communication unit from the stand-by mode into the active mode.

The controller, after the utterance is recognized while the stand-by mode is converted into the active mode, when an additional utterance is not recognized through the voice recognizer within a preset critical time, may convert the active mode into the stand-by mode.

The controller, after the active mode is converted into the stand-by mode, when response information related to the voice is received from the display apparatus through the communication unit, may convert the stand-by mode into the active mode.

The controller, when an additional utterance is not recognized through the voice recognizer within the preset critical time from the time when response information related to the utterance is received from the display apparatus through the communication unit, may convert the active mode into the stand-by mode.

The response information may be information which notifies that a function is performed by the display apparatus based on control information corresponding to the utterance or a response message is output based on response information received from a dialogue server.

The remote controller further includes an output unit, wherein the controller, when the stand-by mode is converted into the active mode, may output an alarm message notifying that the stand-by mode is converted into the active mode through at least one of an audio and a video.

A power control method in a remote controller capable of voice recognition, the method includes receiving a user command to enter a voice recognition mode; converting a stand-by mode into an active mode according to the user command; and converting the active mode into the stand-by mode depending on whether an utterance is recognized within the preset critical time.

The method further includes, when the voice utterance is recognized, transmitting voice information on the recognized utterance to a display apparatus, wherein the converting the stand-by mode into the active mode, according to the user command, may convert an operation mode of a voice recognition module to recognize the voice and a communication module to transmit the voice information from the stand-by mode into the active mode.

The converting into the stand-by mode, after the utterance is recognized while the operation mode is converted into the active mode, when an additional utterance is not recognized within the preset critical time, may convert the active mode into the stand-by mode.

The converting the stand-by mode into the active mode, after the operation mode is converted into the stand-by mode, when response information related to the utterance is received from the display apparatus, may convert the stand-by mode into the active mode.

The converting the operation mode into the stand-by mode, after voice information on the utterance is transmitted to the display apparatus, when response information related to the voice is received from the display apparatus, and when an additional utterance is not recognized within the preset critical time from the time when the response information related to the voice is received, may convert the active mode into the stand-by mode.

The response information may be information which notifies that a function is performed by the display apparatus based on control information corresponding to the utterance or a response message is output based on response information received from a dialogue server.

The converting the stand-by mode into the active mode may, when the stand-by mode is converted into the active mode, output an alarm message notifying that the stand-by mode is converted into the active mode through at least one of an audio and a video.

According to an exemplary embodiment a non transitory computer readable medium storing a power control method in a remote controller capable of voice recognition, where the method includes receiving a user command to enter a voice recognition mode, converting a stand-by mode into an active mode according to the user command, and converting the active mode into the stand-by mode depending on whether a utterance voice is recognized within a preset time.

According to an exemplary embodiment a method includes receiving a voice utterance, and converting a voice recognition remote controller from an active mode to a standby mode when the utterance is not recognized.

The method further includes converting occurs when the utterance is not recognized within a preset time period comprising one of sufficient time for recognition operations of the utterance and sufficient time for display operations associated with the utterance.

The method also includes the voice utterance being received after a voice recognition mode is initiated by a user command and the controller is converted to the active mode from the standby mode.

BRIEF DESCRIPTION OF THE DRAWINGS

The above and/or other aspects will be more apparent and more readily appreciated from the following description of the embodiments with reference to the accompanying drawings, in which.

DESCRIPTION OF THE PREFERRED EMBODIMENT

Reference will now be made in detail to the embodiments, examples of which are illustrated in the accompanying drawings, wherein like reference numerals refer to the like elements throughout. The embodiments are described below to explain the embodiments by referring to the figures.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
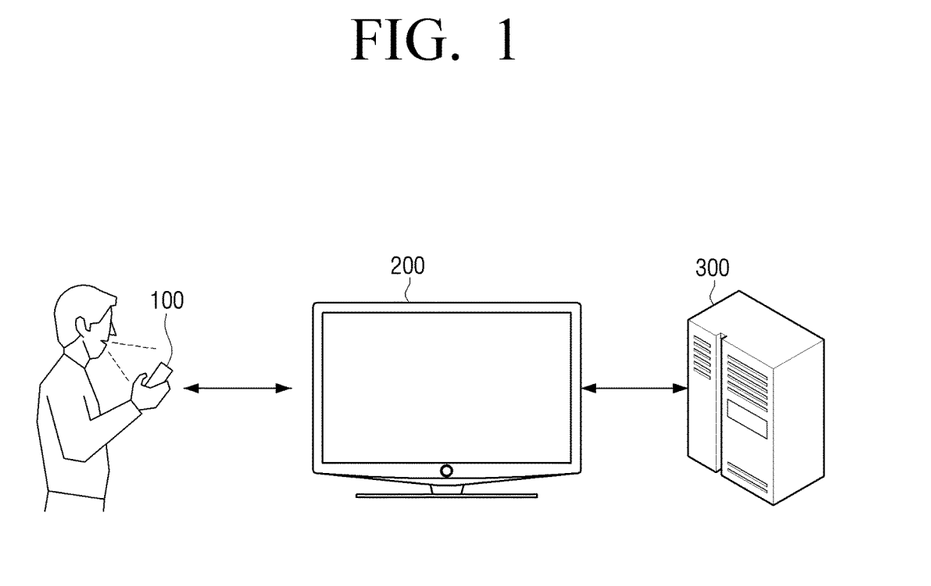
FIG. 1 is an exemplary view illustrating a dialogue system which provides response information suitable to a user voice utterance according to an exemplary embodiment.

FIG. 1 is an exemplary view illustrating a dialogue system which provides response information suitable to a user utterance according to an exemplary embodiment.

As illustrated in FIG. 1, a dialogue system according to an exemplary embodiment includes a remote controller 100, a display apparatus 200, and a dialogue server 300. The remote controller 100 which is to control operations of the display apparatus 200 can be a remote controller. As such, the remote controller 100 is capable of recognizing user utterance and control operations of the display apparatus 200 through the user utterance voice. Such remote controller 100 is capable of controlling operations of the display apparatus 200 through the user utterance while minimizing power internally consumed.

Specifically, a user may select a key button related to a voice recognition mode of the remote controller 100, in order to control functions of the display apparatus 200 with the user utterance voice. When a user command to enter a voice recognition mode is input by using key button, the remote controller 100 may convert a stand-by mode into an active mode into recognize the user utterance voice. Meanwhile, the remote controller 100 may be a stand-by mode until a user command is input. Here, a stand-by mode is a mode into communicate with the display apparatus 200 with minimum power. When a user command is input in this stand-by mode, the remote controller 100 converts a stand-by mode into an active mode in order to recognize the user utterance, and transmit voice information on the recognized utterance to the display apparatus 200. As such, when the user utterance is recognized while a stand-by mode is converted into an active mode, the remote controller 100 transmits voice information on the recognized voice to the display apparatus 200. Thereafter, the remote controller 100, after determining whether or not the user utterance is additionally recognized within the the preset critical time, converts an active mode into a stand-by mode, if the voice utterance is not recognized. As such, by converting a stand-by mode into an active mode or an active mode into a stand-by mode according to a user command such as a voice recognition mode, the remote controller 100 according to an exemplary embodiment can improve usable life of the remote controller 100.

Meanwhile, the display apparatus 200 which performs operations corresponding to voice information received from the remote controller 100, can be realized as various electronic apparatuses such as smart TV, mobile phone such as smartphone, desktop PC, notebook, navigator. To be specific, the display apparatus 200, when voice information on the user's voice is received from the remote controller 100, performs operations corresponding to the received voice information. That is, the display apparatus 200 analyzes voice information received from the remote controller 100 and determines whether or not the received voice information can be internally performed, and according to the results of determination, may perform operations corresponding to the received voice information or perform operations based on response information received from the dialogue server 300.

For example, if the received voice information is a command to adjust volume such as "raise volume," the display apparatus 200 determines whether or not control information corresponding to the received voice information is pre-stored. After determining, if control information corresponding to the received voice information is pre-stored, the display apparatus 200 can adjust volume based on the pre-stored control information.

Meanwhile, if control information corresponding to the received voice information is not pre-stored, the display apparatus 200 may transmit the received voice information to the dialogue server 300, and when response information according to the transmitted voice information is received, perform functions corresponding to the user utterance voice based on the received response information. For example, when received voice information is information asking broadcasting time of a certain program, the display apparatus 200 determines that it cannot be performed internally. Therefore, the display apparatus 200 may transmit voice information received from the remote controller 100 to the dialogue server 300, and when response information is received, the display apparatus 200 may output the corresponding broadcasting time as a voice or a text-type video based on received response information.

The dialogue server 300 converts voice information on the voice utterance received from the display apparatus 200 to text information. Thereafter, the dialogue server 200 extracts utterance elements by analyzing converted text information, generates response information on the user utterance based on the extracted utterance elements, and transmit to the display apparatus 200. In other words, the dialogue server 300, when voice information on the user's voice is received from the display apparatus 200, converts received voice information to text information. Thereafter, the dialogue server 300 analyzes converted text information, generates response information on the voice, and transmits to the display apparatus 200. Herein, utterance elements may be a keyword to perform operations requested by a user.

For example, in case of voice "what time does ooo(a broadcasting program title) start on Saturday of this week?," utterance elements may be "this week", "Saturday", "ooo(a broadcasting program title)", "what time", and "broadcasting". When such utterance elements are extracted, the dialogue server 200 generates response information on broadcasting time when the corresponding broadcasting program starts based on the extracted utterance elements and transmits to the display apparatus 200. Therefore, the display apparatus 200, as described above, may output a response message "ooo(a broadcasting program title) starts at 7:00" in a voice or text type video based on response information received from the dialogue server 300.

Figure 2:
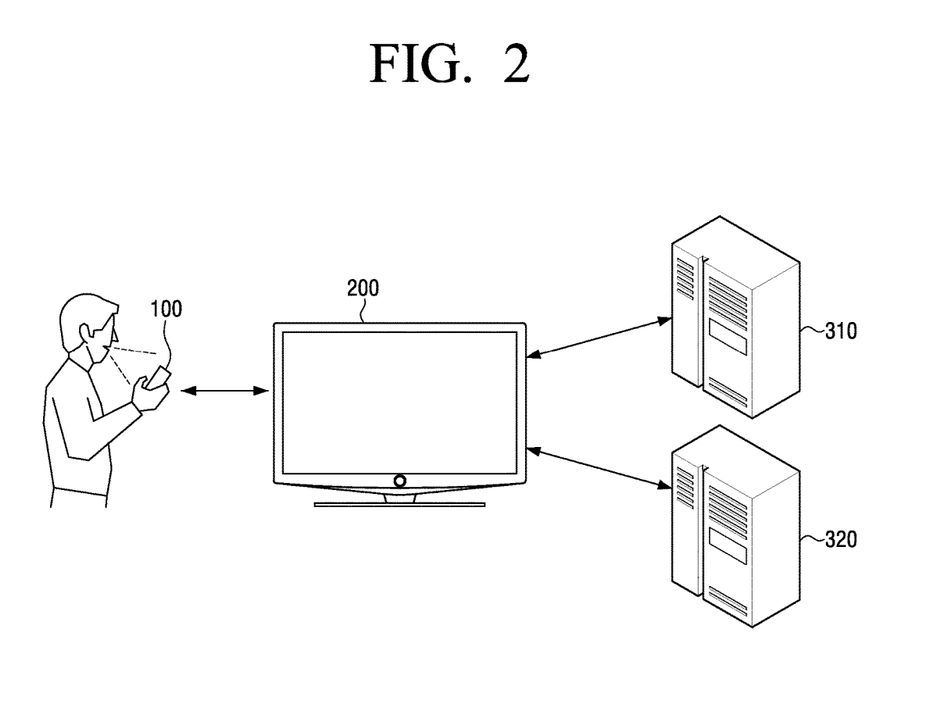
FIG. 2 is an exemplary view an exemplary view illustrating a dialogue system which provides response information suitable to a user utterance according to another exemplary embodiment.

As illustrated in FIG. 2, the dialogue server 300 which provides response information based on the user utterance voice may include the first server 310 and the second server 320.

FIG. 2 is an exemplary view an exemplary view illustrating a dialogue system which provides response information suitable to the user utterance voice according to another exemplary embodiment.

As described above, the remote controller 100 converts a stand-by mode into an active mode according to a user command to enter a voice recognition mode. Thereafter, when the user utterance voice is recognized, the remote controller 100 transmits voice information on the recognized voice to the display apparatus 200. The display apparatus 200 which received voice information on the user utterance voice determines whether or not it is performed internally based on received voice information, and if it is not possible, voice information is transmitted to the first server 310. When voice information is received from the display apparatus 200, the first server 310, based on a certain pattern on the pre-stored various voices, generates the received voice information as text information and transmits to the display apparatus 200. Thereafter, the display apparatus 200 transmits text information on the user utterance voice received from the first server 310 to the second server 320. The second server 320 which receives text information on the user utterance voice analyzes the received text information and extracts utterance elements, and based on the extracted factors, generates response information to perform operations corresponding to a voice, and transmits to the display apparatus 200. Accordingly, the display apparatus 200 may perform operations corresponding to the user utterance voice based on response information received from the second server 320.

Until now, a dialogue system composed of the remote controller 100, the display apparatus 200, and the dialogue server 300 according to an exemplary embodiment has been described in brief. Hereinbelow, each configuration of the remote controller 100 which recognizes the user voice utterance according to an exemplary embodiment will be described in detail.

Figure 3:
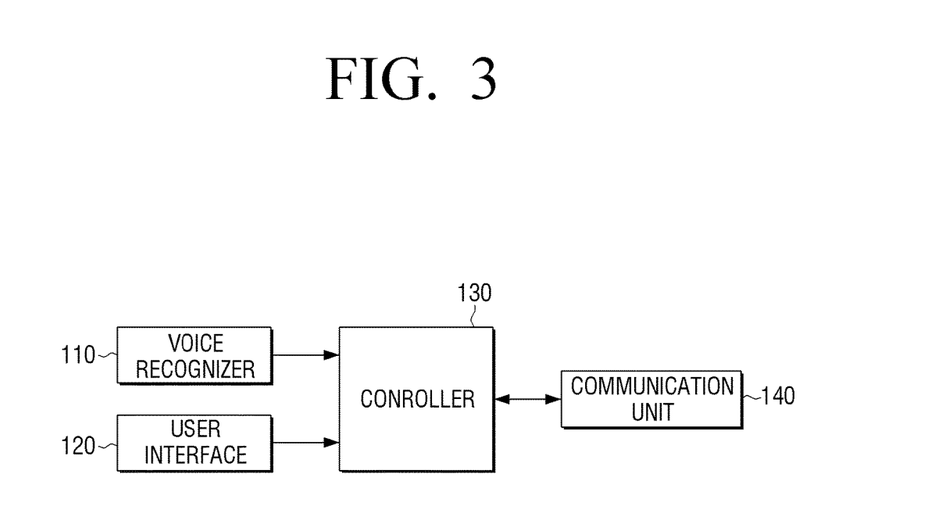
FIG. 3 is a block diagram illustrating a remote controller according to an exemplary embodiment.

FIG. 3 is a block diagram illustrating a remote controller according to an exemplary embodiment.

As illustrated in FIG. 3, the remote controller 100 includes the voice recognizer 110, the user interface 120, the controller 130, and the communication unit 140.

The voice recognizer 110 generates voice information which is the user utterance voice signal by recognizing the user utterance voice and removing noise (for example air-conditioner sound, cleaner sound, music sound, etc.) from the recognized voice. Specifically, the voice recognizer 110, when the user utterance voice in an analog type is input, performs sampling of the input voice and converts it to a digital signal. In this case, the voice recognizer 110 determines whether there is noise in the voice converted into a digital signal, and if it is determined that there is noise, removes noise from the converted voice. Accordingly, the voice recognizer 110 may generate voice information which is a digital signal on the user utterance voice from which noise is removed.

The user interface 120 is a configuration to receive a user command, more particularly, it may receive a user command to enter a voice recognition mode. The user interface 120 can be realized as a touch pad, or a key pad equipped with various function keys, a number key, a special key, a letter key, or a touch screen. If it is realized as a touch screen, the user interface 120 can receive a UI selected among UI screens displayed through a display 171 of an output unit 170 which will be described later, as a user command.

The controller 130 controls overall configurations of the remote controller 100, more particularly, when a user command to enter a voice recognition mode through the user interface 120 is received, a stand-by mode is converted into an active mode. Thereafter, the controller 130 converts an active mode to a stand-by mode depending on whether or not the user utterance is recognized through the voice recognizer 110 within the preset critical time.

Herein, a stand-by mode may be a mode where power is supplied so that the remote controller 100 can perform minimum operations, and an active mode may be a mode where power is supplied so that the remote controller 100 can perform smooth operations. Herein, the minimum operations may be operations to the extent when communication between the remote controller 100 and the display apparatus 200 can be maintained according to an exemplary embodiment, and smooth operations may be operations to the extent when the remote controller 100 transmits a control method corresponding to a user command to the display apparatus 200, and receives response information thereof.

Specifically, when any user command is not input thorough the user interface 120, the remote controller 100 may maintain a stand-by mode. Under this stand-by mode, when a user command is received through the user interface 120, the controller 130 converts a stand-by mode into an active mode. In this case, it is desirable that the controller 130 only converts a stand-by mode to an active mode for the confiuration of performing operations corresponding to a received user command. According to an exemplary embodiment, when a user command is input to enter a voice recognition mode, the controller 130 may convert an operation mode of the voice recognizer 110 and the communication unit 140 to an active mode. As such, when an operation mode of the voice recognizer 110 and the communication unit 130 are converted to an active mode, the controller 130 determines whether or not the user utterance is recognized through the voice recognizer 110 within the preset critical time. As a result of determination, if the user utterance is recognized through the voice recognizer 110 within the preset critical time, the communication unit 140 may transmit voice information on an utterance voice to the display apparatus 200 according to a control command of the controller 130.

Meanwhile, the controller 130, when voice information on the user utterance is transmitted to the display apparatus 200 through the communication unit 140, as described above, determines whether or not the user utterance is recognized through the voice recognizer 110 within the preset critical time. As a result of determination, if the user utterance is not recognized within the preset critical time, the controller 130 converts an operation mode of the voice recognizer 110 and the communication unit 140 from an active mode to a stand-by mode. As such, the remote controller 100 according to an exemplary embodiment can minimize consumption of power supplied to the remote controller 100 by converting a stand-by mode to an active mode or an active mode to a stand-by mode according to a user command such as a voice recognition mode.

Meanwhile, as described above, the communication unit 140 communicates with the display apparatus 200 and transmits voice information of the user utterance to the display apparatus 200. Specifically, the communication unit 140, according to short-distance wireless communication method such as Bluetooth, Zigbee, IR communication, and RF communication, may perform wireless communication with the display apparatus 200. To do this, the communication unit 140 can be equipped with a communication module which can be used for each communication type.

For example, when performing communication according to a Bluetooth communication method, the communication unit 140 performs pairing with the display apparatus 200 through Bluetooth, and can be the status where communication with the display apparatus 200 is available. Moreover, when Zigbee communication module is provided, the communication unit 140 can perform pairing with the display apparatus 200 through the Zigbee communication module, and can be the status where communication with the display apparatus 200 is available. Meanwhile, when performing communication according to IR communication or RF communication method, the communication unit 140 can perform communication by transceiving IR signal or RF with the display apparatus 200. In addition, the communication unit 140 can perform wireless communication with the display apparatus 200 by using Wi-Fi, etc. For example, the communication unit 140 can perform communication with the display apparatus 200 through Wi-Fi communication module, not requiring a separate network, by being directly connected with the display apparatus 200, or being connected to a network by using an access point (AP). As such, the communication unit 140 can perform communication with the display apparatus 200 by using various communication methods. Until now, each configuration of the remote controller 100 according to an exemplary embodiment has been described in brief. Hereinbelow, each of the aforementioned remote controller 100 will be explained in further detail.

Figure 4:
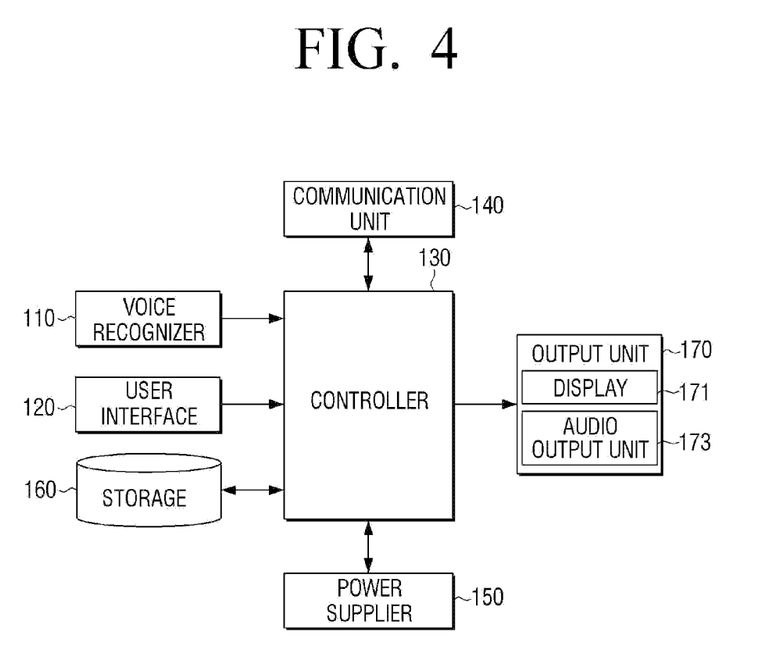
FIG. 4 is a detailed view illustrating a remote controller according to an exemplary embodiment.

FIG. 4 is a detailed view illustrating a remote controller according to an exemplary embodiment.

As illustrated in FIG. 4, the remote controller 100 includes the voice recognizer 110, the user interface 120, the controller 130, the communication unit 140, a power supplier 150, a storage 160, and an output unit 170. Among the configurations illustrated in FIG. 4, the configurations overlapped with those of FIG. 3 will not be further explained.

A power supplier 150 supplies power to each configuration of the remote controller 100, and the storage 160 stores the preset critical time to convert identification information and an operation mode of the remote controller 100 into a stand-by mode or an active mode. Moreover, the storage 160 may be storage media where various programs are stored in order to operate the remote controller 100. Such storage 160 may include at least one type of storage media among a flash memory type, a hard disk type, a multimedia card micro type, a card type memory (for example, SD or XD memory, etc.), RAM, and ROM.

The output unit 170 which outputs at least one of an audio and a video may include a display 171 and a audio output unit 173. The display 171, as described above, may provide a UI screen, when the user interface 120 is embodied as a touch screen type, to receive a user command. In addition, the display 171 may provide information received through the user interface 120 as a text type or provide remaining life of battery, etc. In addition, the display 171, through the communication unit 140, may display video data included in the content received from an external apparatus such as the display apparatus 200. The audio output unit 173, when a user command is input through the user interface 120, may output a buzzer sound notifying that a user command is input. Moreover, the audio output unit 173, through the communication unit 140, may output audio data included in the content received from an external apparatus such as the display apparatus 200.

When the output unit 170 is converted from a stand-by mode including the display 171 and the audio output unit 173 to an active mode, an alarm message notifying that a stand-by mode is converted to an active mode can be output through at least one of the display 171 and the audio output unit 173. According to an exemplary embodiment, when a user command is input from a stand-by mode through the user interface 120 to enter a voice recognition mode, the controller 130 may convert a stand-by mode into an active mode to recognize the user utterance voice. As such, when an operation mode of the remote controller 100 is converted to an active mode, the output unit 170, according to a control command of the controller 130, can output an alarm message notifying that a stand-by mode is converted into an active mode through at least one of the display 171 and the audio output unit 173.

Meanwhile, as described above, the controller 130, while an operation of the remote controller 100 is a stand-by mode, when a user command is input through the user interface 120 to enter a voice recognition mode, converts a stand-by mode into an active mode. As described above, a stand-by mode can be a mode to supply power so that the remote controller 100 can perform minimum operations. According to an exemplary embodiment, the communication unit 140 can communicate with the display apparatus 200 through the Bluetooth communication module. In this case, the controller 130 can block power supply from the power supplier 150 to the other configurations excluding the communication unit 140 communicating with the display apparatus 200. Accordingly, the remote controller 100 can maintain a stand-by mode which performs operations in the level of maintaining communication with the display apparatus 200.

Meanwhile, an active mode can be a power supply mode so that the remote controller 100 can be activated and perform operations. For example, a user command to enter a voice recognition mode through the user interface 120 can be input. In this case, the controller 130 can increase power to the communication unit 140 communicating with the display apparatus 200, and authorize power to be supplied from the power supplier 150 to the voice recognizer 110 recognizing user utterance voice. Accordingly, an operation mode of the voice recognizer 110 and the communication unit 140 can be converted from a stand-by mode to an active mode, and the voice recognizer 110 can recognize the user utterance voice. The communication unit 140 can transmit voice information on the user utterance to the display apparatus 200.

As such, when a user command which converts an operation mode of the configuration performing operations on a user command input through the user interface 120 from a stand-by mode to an active mode, the controller 130 may convert an operation mode on the all the configurations composing the remote controller 100 into an active mode. In this embodiments, converting an operation of the configuration performing operations on a user command input through the user interface 120 into an active mode only will be described.

As described above, when a user command is input to enter a voice recognition mode, the controller 130 supplies power supplied from the power supplier 150 to the voice recognizer 110 and the communication unit 140 respectively. Accordingly, an operation mode of the voice recognizer 110 and the communication unit 140 can be converted into an active mode. As such, when an operation mode of the voice recognizer 110 and the communication unit 140 are converted into an active mode, the controller 130, through the voice recognizer 110, determines whether the user utterance is recognized within the preset critical time. As a result, when user voice utterance is recognized through the voice recognizer 110 within the preset critical time, an operation mode of at least one activated configuration can be maintained as or in an active mode, and when the user utterance is not recognized, an operation mode of at least one activated configuration can be converted into a stand-by mode. As such, the remote controller 100 according to the exemplary embodiment, when a voice recognition mode is entered, can automatically convert an operation mode to an active mode or a stand-by mode depending on whether the user utterance is recognized or not, and therefore the problem of shortening of battery life can be improved.

According to an exemplary embodiment, the controller 130, while being converted into an active mode, after user utterance is recognized through the voice recognizer 110, determines whether or not the additional user utterance is recognized through the voice recognizer 110 within the preset critical time. As a result of the determination, when the additional user utterance is recognized within the preset critical time, the controller 130 maintains an active mode which is the present operation mode of the voice recognizer 110. Meanwhile, if the additional utterance is determined as not being recognized within the preset critical time, the controller 130 converts an active mode which is the present operation mode of the voice recognizer 110 to a stand-by mode. Meanwhile, the controller 130, after an operation mode of the voice recognizer 110 is converted to a stand-by mode, when response information on utterance is received from a display apparatus 100 through the communication unit, converts an operation mode of the voice recognizer 110 from a stand-by mode to an active mode.

As described above, when a user command to enter a voice recognition mode is input, the controller 130 authorizes power to be supplied from the power supplier 150 to the voice recognizer 110. At this time, it is desirable that the controller 130, by increasing power supply of the communication unit 140 performing communication with the display apparatus 200, convert an operation mode of the communication unit 140 into an active mode. As such, while an operation mode of the voice recognizer 110 and the communication unit 140 is converted into an active mode, the user utterance is recognized through the voice recognizer 110, the controller 130 determines whether or not the additional utterance is recognized within the preset critical time. Herein, the preset critical time, after user utterance is recognized, is information on the preset time to determine whether or not the additional utterance is recognized. Such preset critical time can be stored in the storage 160. For example, when the preset critical time stored in the storage 160 is 3 seconds, the controller 130, after the user utterance is recognized through the voice recognizer 110, determines whether or not the additional utterance is recognized within 3 seconds. As a result, if it is determined that the additional utterance is not recognized within 3 seconds, the controller 130, through the communication unit 140 which is an active mode, transmits voice information on user utterance to the display apparatus 200. Along with this, the controller 130 converts an active mode which is the present mode of the voice recognizer 110 to a stand-by mode. In this case, the controller 130, when voice information on the user utterance is transmitted to the display apparatus 200 through the communication unit 140, can convert an operation mode of the communication unit 140 to a stand-by mode.

Meanwhile, the controller 130, when response information related to user utterance is received from the display apparatus 200 which transmits voice information on user utterance, converts an operation mode of the voice recognizer 110 which is a stand-by mode to an active mode. Herein, response information is information notifying that the display apparatus 200 performs functions based on control information corresponding to user utterance or a response message is output based on response information received from the dialogue server 300.

For example, the display apparatus 200 can receive voice information on the user utterance "what time does ○○○(a broadcasting program title) start on Saturday of this week?" from the remote controller 100. When such voice information is received, the display apparatus 200, as described above, transmits received voice information to the dialogue server 300, and receives response information from the dialogue server 300. Therefore, the display apparatus 200, as described above, may output a response message "○○○(a broadcasting program title) starts at 7:00" in a voice or text type video based on response information received from the dialogue server 300. As such, when a response message is output based on response information received from the dialogue server 300, the display apparatus 200 can transmit response information notifying that a response message on user utterance is output to the remote controller 100.

As another exemplary embodiment, the display apparatus 200 can receive voice information on user utterance, "volume down," from the remote controller 100. When such voice information is received, the display apparatus 200 can adjust volume based on pre-stored control information. As such, when functions are performed based on control information corresponding to user utterance, the display apparatus 200 can transmit response information informing that functions are performed to the remote controller 100 based on user utterance voice or voice utterance.

Such response information is received through the communication unit 140, the controller 130, in order to recognize a user's additional voice utterance, converts an operation mode of the voice recognizer 110 from a stand-by mode to an active mode. Thereafter, the controller 130, through the voice recognizer 110 reconverted to an active mode, can determine whether the additional utterance is recognized within the preset critical time, and can convert an operation mode of the voice recognizer 110 which is an active mode now to a stand-by mode, or maintain a current operation mode.

According to still another exemplary embodiment, the controller 130, when the additional utterance is not recognized through the voice recognizer 110 within the preset critical time from the time when response information related to the utterance is received from the display apparatus through the communication unit 140, may convert the active mode into the stand-by mode. Herein, the preset critical time, after user utterance is recognized, is information on the preset time to determine whether or not the additional utterance is recognized. Such preset critical time can be stored in the storage 160.

As described above, the display apparatus 200, when voice information on user utterance is received, can perform functions based on pre-stored control information related to received voice information. In addition, the display apparatus 200 may receive response information on received voice information from the dialogue server 300, and output a response message based on the received response information. Such display apparatus 200, after performing functions based on received voice information or outputting response message, transmits response information to the remote controller 100. When response information is received from the display apparatus 200, the controller 130 determines whether or not the user utterance is recognized through the voice recognizer 110 within the preset critical time. As a result of determination, when user utterance is recognized within the preset critical time, the controller 130 maintains an active mode which is the present operation mode of the voice recognizer 110. Meanwhile, if utterance is determined as not being recognized within the preset critical time, the controller 130 converts an active mode which is the present operation mode of the voice recognizer 110 to a stand-by mode.

In the meantime, the preset critical time stored in the storage 160 can be time required by the display apparatus 200 to perform operations corresponding to user utterance voice. In this case, the controller 130, when voice information on the user utterance is transmitted to the display apparatus 200 through the communication unit 140, can maintain an active mode. For example, when the preset critical time stored in the storage 160 is 60 seconds, the controller 130, after user utterance is recognized through the voice recognizer 110, determines whether or not the additional utterance is recognized within 60 seconds. As a result, it the additional utterance is recognized, the controller 130 can maintain current active mode of the voice recognizer 110, and when the additional utterance is not recognized within the preset critical time, the voice recognizer 110 can convert current an active mode into a stand-by mode.

As such, the controller 130 according to an exemplary embodiment, depending on whether user utterance is recognized, can automatically convert an operation mode of a voice recognition mode including the voice recognizer 110 to an active mode or a stand-by mode, consequently minimizing unnecessarily consumed power by the remote controller 100.

Meanwhile, the afore-mentioned controller 130, based on a control command of the display apparatus 200, can convert an operation mode of a voice recognition mode including the voice recognizer 110 into an active mode or a stand-by mode. In this case, the display apparatus 200 can store the preset critical time information in order to convert an operation mode of the remote controller 100 into a stand-by mode or an active mode.

According to an exemplary embodiment, the display apparatus 200, when communication with the remote controller 100 begins, can receive state or status information indicating current status of an operation mode form the remote controller 100. As such, when status information of the remote controller 100 is received, the display apparatus 200 can determine the current operation mode of the remote controller 100 through the received status information. As a result, if it is deemed that an operation mode of the remote controller 100 is a stand-by mode, the display apparatus 200, until separate event information is received from the remote controller 100, does not transmit separate control information so that an operation mode of the remote controller 100 can maintain a stand-by mode.

Meanwhile, the remote controller 100, when a user command to enter a voice recognition mode is input, transmits corresponding event information to the display apparatus 200. When such event information is received, the display apparatus 200 transmits control information to the remote controller 100, so as to convert an operation module on a voice recognition mode to an active mode. According to the control information, the controller 130 of the remote controller 100 can increase power supply to the communication unit 140 communicating with the display apparatus 200, and authorize power supplied from the power supplier 150 to the voice recognizer 110 recognizing user utterance voice. Accordingly, an operation mode of the voice recognizer 110 and the communication unit 140 can be converted from a stand-by mode to an active mode, and the voice recognizer 110 can recognize the user utterance voice. The communication unit 140 can transmit voice information on the user utterance to the display apparatus 200.

Meanwhile, the display apparatus 200 which transmits control information to the remote controller 100 based on the received event information, determines whether or not voice information on user utterance is received within the preset critical time from the remote controller 100. As a result, if voice information on user utterance is received within the preset critical time from the remote controller 100, the display apparatus 100, based on the preset condition, maintains an active mode which is the present operation mode of the remote controller 100. Meanwhile, if voice information on user utterance is not received within the preset critical time from the remote controller 100, the display apparatus 200 transmits control information to convert into a stand-by mode to the remote controller 100.

Therefore, the controller 130 of the remote controller 100, based on control information received from the display apparatus 200, can convert an active mode to a stand-by mode.

Meanwhile, the display apparatus 200, after voice information is received from the remote controller 100, when additional voice information is not received within the preset critical time, transmits control information to the remote controller 100 in order to convert into a stand-by mode. As such, while an operation mode of the remote controller 100 is converted from an active mode to a stand-by mode, the display apparatus 200, when a user command to enter a voice recognition mode is input or response information corresponding to user utterance is received from the dialogue server 300, transmit control information to convert into an active mode to the remote controller 100. Accordingly, the controller 130 of the remote controller 100, based on control information received from the display apparatus 100, can transmit an operation mode from a stand-by mode to an active mode.

Until now, each configuration of the remote controller 100 according to an exemplary embodiment has been explained in detail. Hereinbelow, a power control method according to recognition of user utterance by a remote controller will be explained in higher detail.

Figure 5:
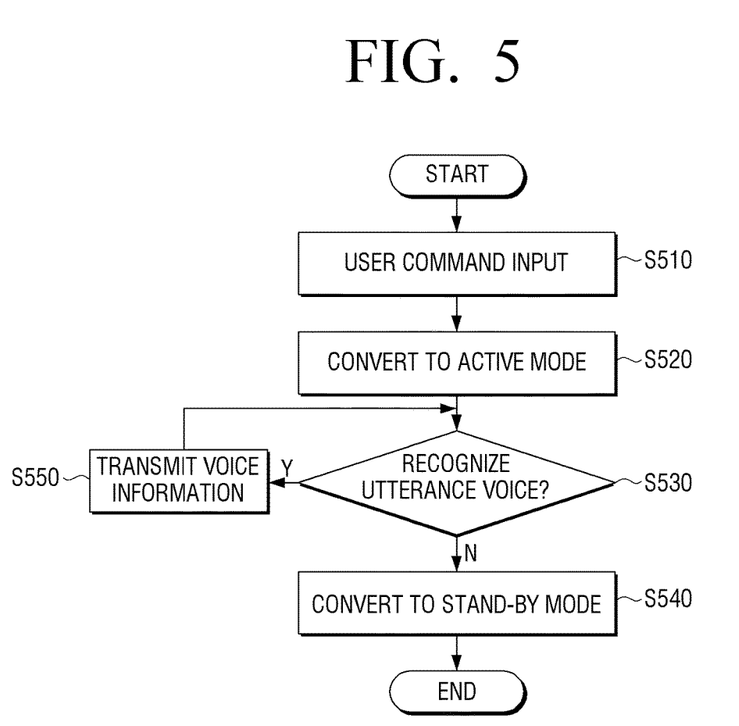
FIG. 5 is a flow chart illustrating power control method of a remote controller according to an exemplary embodiment.

FIG. 5 is a flow chart illustrating power control method of a remote controller according to an exemplary embodiment.

As illustrated in FIG. 5, a remote controller, when a user command to enter a voice recognition mode is input, converts a stand-by mode into an active mode according to input user command (S510,S520). Herein, a stand-by mode may be a mode where power is supplied so that the remote controller can perform minimum operations, and an active mode may be a mode where power is supplied so that the remote controller 100 can perform smooth or full operations. Herein, the minimum operations may be operations to the extent when communication between the remote controller 100 and the display apparatus 200 can be maintained according to an exemplary embodiment, and smooth operations may be operations to the extent when the remote controller 100 transmits a control method corresponding to a user command to the display apparatus 200, and receives response information thereof.

According to an exemplary embodiment, when any user command is not input, the remote controller may maintain a stand-by mode. Under such stand-by mode, when a user command to enter a voice recognition mode is input, the remote controller can recognize user utterance and convert an operation mode of a voice recognition mode performing corresponding operations to an active mode. That is, the remote controller, when a user command to enter a voice recognition mode is input, can convert a voice recognition module to recognize voice and an operation module of a communication module to transmit voice information on user utterance to a display apparatus from a stand-by mode to an active mode. However, the embodiment is not limited to the above, and the remote controller, when a user command to enter a voice recognition mode is input, can convert an operation mode of each configuration of the remote controller to an active mode.

As such, when a stand-by mode is converted into an active mode according to a user command, the remote controller can output an alarm message notifying that a stand-by mode is converted to an active mode through at least one of an audio or a video message. Therefore, a user can determine from an alarm message output from the remote controller whether or not the remote controller enters an operation mode capable of voice recognition.

Meanwhile, when an operation mode is converted into an active mode, the remote controller determines whether or not user utterance is recognized within the preset critical time (S530). As a result, if user utterance is not recognized within the preset critical time, the remote controller converts an active mode to a stand-by mode (S540). As described above, if a voice recognition module to recognize utterance and a communication module to transmit voice information on utterance to the display apparatus is in an active mode, the remote controller can convert an operation mode of a voice recognition module and a communication module into a stand-by mode. Meanwhile, as a result of determination, if user utterance is recognized within the preset critical time, the remote controller transmits voice information on recognized user utterance to the display apparatus (S550). Thereafter, the remote controller determines whether or not the additional utterance is recognized within the preset critical time, and when the additional utterance is not recognized, converts an operation module of a voice recognition module and a communication module activated through S540 into a stand-by mode.

As such, the remote controller according to an exemplary embodiment, depending on whether user utterance is recognized, can convert an operation mode to an active mode or a stand-by mode, and can minimize unnecessarily consumed power by the remote controller 100. Hereinbelow, the method of converting an operation mode is described in higher detail.

Figure 6:
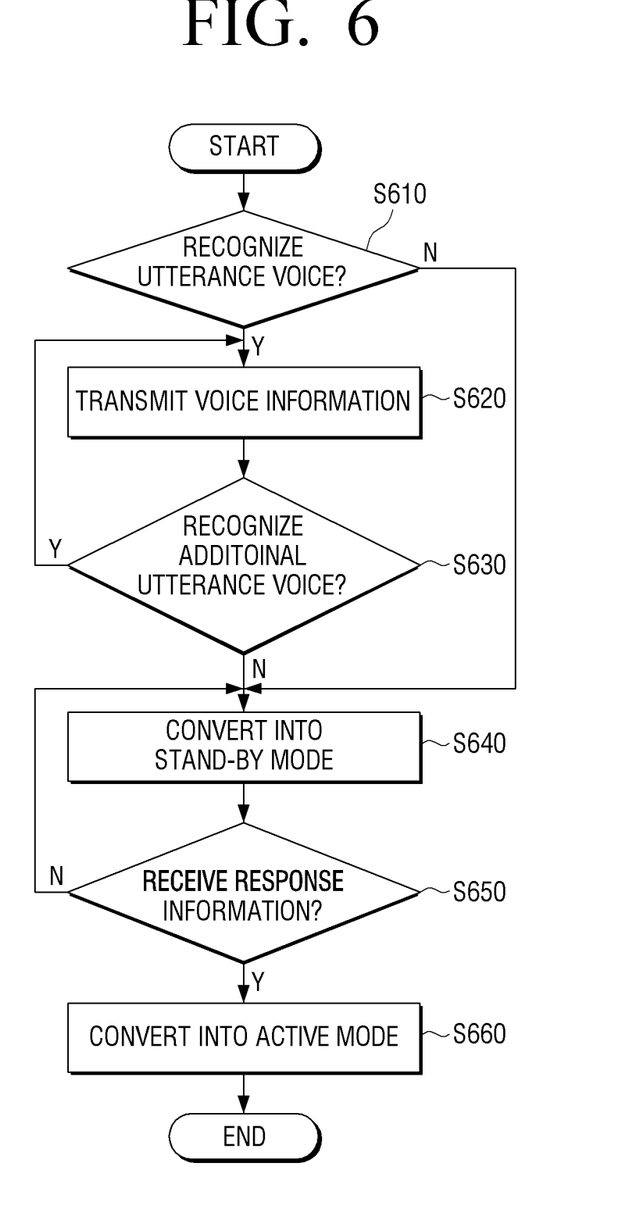
FIG. 6 is flow chart of the first method which describes that an operation mode is converted depending on whether utterance is recognized or not by a remote controller according to an exemplary embodiment.

FIG. 6 is flow chart of a first method which describes that an operation mode is converted depending on whether voice is recognized or not by a remote controller according to an exemplary embodiment.

As illustrated in FIG. 6, while an operation mode of a voice recognition module and a communication module is an active mode, the remote controller determines whether or not user utterance is recognized (S610). As a result of the determination, when user utterance is not recognized within the preset critical time, the remote controller converts an operation mode of a voice recognition module and a communication module through S640 which will be described later into a stand-by mode. Herein, supplying power of a stand-by mode of a voice recognition mode can be blocked, and supplying power of a stand-by mode of a communication module can be in a level to maintain communication with a display apparatus.

Meanwhile, as a result of the determination, when user utterance is recognized within the preset critical time, the remote controller transmits voice information on the recognized utterance to a display apparatus (S620). Thereafter, the remote controller determines whether or not the additional utterance is recognized within the preset critical time by a user (S630). As a result of determination, when the additional utterance is recognized within the preset critical time, the remote controller maintains an active mode which is an operation module of a voice recognition module and a communication module. Meanwhile, when it is determined that the additional utterance is not recognized within the preset critical time, the remote controller converts an operation mode of a voice recognition module from an active mode to a stand-by mode (S640). In this case, the remote controller may convert an operation mode of activated communication module to a stand-by mode. Herein, the preset critical time, after user utterance is recognized, is information on the preset time to determine whether or not the additional utterance is recognized. For example, when the preset critical time is 3 seconds, the remote controller, after user utterance is recognized, determines whether or not the additional utterance is recognized within 3 seconds. As a result, if it is determined that the additional utterance is not recognized within 3 seconds, the remote controller converts an operation mode of a voice recognition module and a communication module to a stand-by mode.

Thereafter, the remote controller determines whether or not response information is received from the display apparatus (S650). As a result of determination, when response information is not received from the display apparatus, the remote controller maintains a stand-by mode which a current operation mode of a voice recognition module and a communication module. Meanwhile, the remote controller, when response information is received from the display apparatus, converts an operation mode of a voice recognition module and a communication module which is a stand-by mode to an active mode. Herein, response information is information notifying that the display apparatus performs functions based on control information corresponding to user utterance or a response message is output based on response information received from the dialogue server.

Accordingly, the remote controller determines whether or not the afore-mentioned response information is received from the display apparatus, and when response information is not received, maintains a stand-by mode which is a current operation mode. Meanwhile, when response information is received from the display apparatus, the remote controller converts an operation mode of a voice recognition module and a communication module into an active mode. As such, if an operation mode of a voice recognition module and a communication module is converted into an active mode, the remote controller, through the above-mentioned S610, may determine whether utterance is recognized from a user within the preset critical time, and maintain an operation mode of a voice recognition module and a communication module as an active mode or perform conversion to a stand-by mode.

Figure 7:
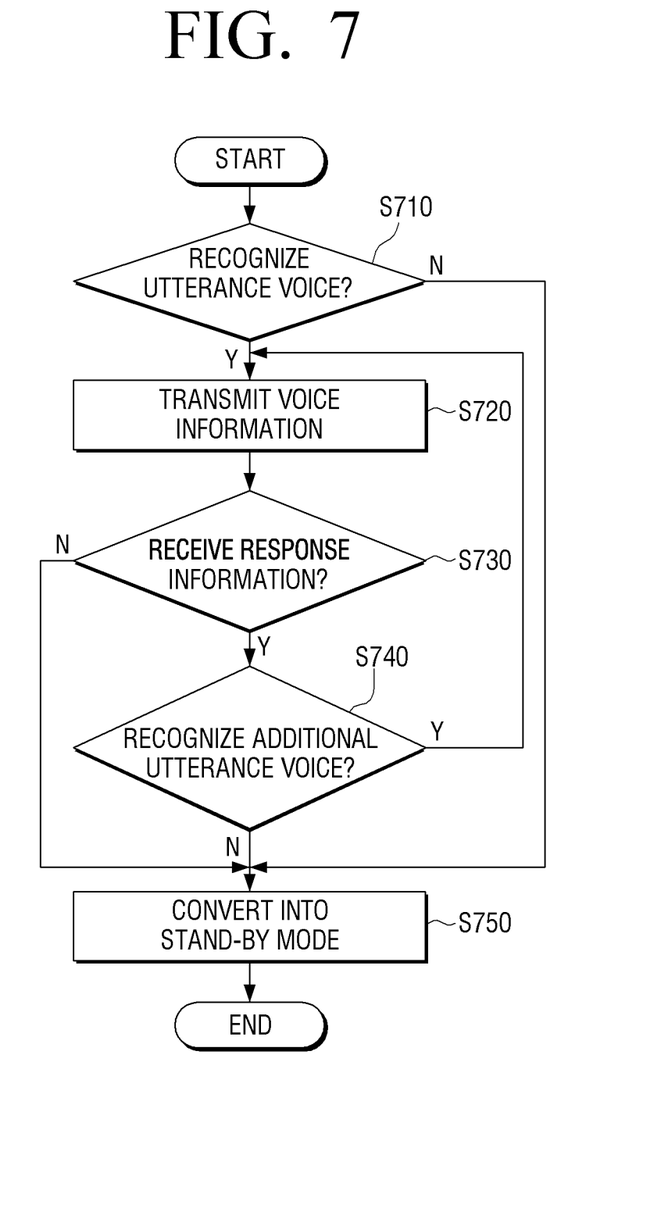
FIG. 7 is flow chart of the second method which describes that an operation mode is converted depending on whether utterance is recognized or not by a remote controller according to an exemplary embodiment.

FIG. 7 is flow chart of a second method which describes that an operation mode is converted depending on whether voice is recognized or not by a remote controller according to an exemplary embodiment.

As illustrated in FIG. 7, while an operation mode of a voice recognition module and a communication module is an active mode, the remote controller determines whether or not user utterance is recognized (S710). As a result of determination, when user utterance is not recognized within the preset critical time, the remote controller converts an operation mode of a voice recognition module and a communication module through S740 which will be described later into a stand-by mode. Herein, supplying power of a stand-by mode of a voice recognition mode can be blocked, and supplying power of a stand-by mode of a communication module can be in a level to maintain communication with a display apparatus.

Meanwhile, as a result of determination, when user utterance is recognized within the preset critical time, the remote controller transmits voice information on recognized utterance to a display apparatus (S720). Thereafter, the remote controller, when the additional utterance is not input from the time when response information on user utterance is received within the preset critical time, converts an operation mode of a voice recognition module and a communication module from an active mode to a stand-by mode. Specifically, the remote controller determines whether or not response information on user utterance is received (S730). As a result of determination, when it is determined that the additional utterance is not recognized within the preset critical time, the remote controller converts an operation mode of a voice recognition module from an active mode to a stand-by mode (S750). Herein, the preset critical time can be time, which is required from when voice information on utterance is transmitted through 720 until when response information thereof is received from the display apparatus. For example, when the preset critical time is 10 seconds, the remote controller, after voice information on user utterance is transmitted, determines whether or not response information is received within 10 seconds from the display apparatus. As a result of the determination, when response information is not received from the display apparatus within 10 seconds, the remote controller converts an operation mode of a voice recognition module and a communication module which is now an active mode into a stand-by mode.

Meanwhile, when response information is received from the display apparatus within the preset critical time, the remote controller determines whether or not the additional utterance is recognized (S740). Herein, the preset critical time can be time required from when response information is received from the display apparatus until when the additional utterance is recognized. As such, when the additional utterance is recognized within the preset critical time, the remote controller, through above-mentioned S720, transmits voice information on the additional utterance to the display apparatus. Meanwhile, when the additional utterance is not recognized within the preset critical time, the remote controller converts an operation mode of a voice recognition module and a communication module which is an active mode to a stand-by mode (S750).

As such, the remote controller according to an exemplary embodiment user utterance, by automatically converting an operation mode to an active mode or a stand-by mode depending on whether user utterance is recognized or not, the controller can minimize the problem of unnecessary shortening of battery life.

The apparatus and method have been described focusing on exemplary embodiments.

Although a few embodiments have been shown and described, it would be appreciated by those skilled in the art that changes may be made in these embodiments without departing from the principles and spirit and the scope which is defined in the claims and their equivalents.

What is claimed is:

1. A remote controller, comprising:
a communicator;
a voice recognizer;
a user interface; and
a controller configured to:
based on a user command input through the user interface while the remote controller is in a stand-by mode in which a user voice is unrecognizable, convert the stand-by mode into an active mode in which the user voice is recognizable, and
based on receiving a first voice while the remote controller is in the active mode, control the communicator to transmit the first voice to an external display apparatus,
based on receiving a second voice following the first voice while the remote controller is in the active mode of a critical time period, maintain the active mode,
based on not receiving the second voice following the first voice while the remote controller is in the active mode of the critical time period, convert the active mode into the stand-by mode, based on receiving response information related to the first voice from the external display apparatus after converting the active mode into the stand-by mode, convert the stand-by mode into the active mode, wherein, in the stand-by mode, the controller is configured to supply a power to the communicator and block power supply to the voice recognizer, and wherein, in the active mode, the controller is configured to supply the power to the communicator and the voice recognizer.

2. The remote controller of claim 1, wherein the response information is information which notifies that a function is performed by the display apparatus based on control information corresponding to the first voice or a response message is output based on response information received from a dialogue server.

3. The remote controller of claim 1 further comprising:
an output unit,
wherein the controller, based on the remote controller converting from the stand-by mode into the active mode, outputs an alarm message notifying that the stand-by mode is converted into the active mode through at least one of an audio and a video.

4. A power control method in a remote controller, the remote controller comprising a voice recognizer and a communicator, the method comprising:
based on a user command input through the user interface while the remote controller is in a stand-by mode in which a user voice is unrecognizable, converting the stand-by mode into an active mode in which the user voice is recognizable; based on receiving a first voice while the remote controller is in the active mode, transmitting the first voice to an external display apparatus through the communicator;
based on receiving a second voice following the first voice while the remote controller is in the active mode of a critical time period, maintain the active mode;
based on not receiving the second voice following the first voice while the remote controller is in the active mode of the critical time period, converting the active mode into the stand-by mode; and
based on receiving response information related to the first voice from the external display apparatus after converting the active mode into the stand-by mode, converting the stand-by mode into the active mode, wherein, in the stand-by mode, a power is supplied to the communicator and power supply to the voice recognizer is blocked, and wherein, in the active mode, the power is supplied to the communicator and the voice recognizer.

5. The method of claim 4, wherein the response information is information which notifies that a function is performed by the display apparatus based on control information corresponding to the first voice or a response message is output based on response information received from a dialogue server.

6. The method of claim 5, further comprising;
outputting, based on the remote controller converting from the stand-by mode into the active mode, an alarm message notifying that the stand-by mode is converted into the active mode through at least one of an audio and a video.

7. A non transitory computer readable medium storing a power control method in a remote controller the remote controller comprising a voice recognizer and a, the method comprising:
based on a user command input through the user interface while the remote controller is in a stand-by mode in which a user voice is unrecognizable, converting the stand-by mode into an active mode in which the user voice is recognizable;
based on receiving a first voice while the remote controller is in the active mode, transmitting the first voice an external display apparatus;
based on receiving a second voice following the first voice while the remote controller is in the active mode of a critical time period, maintaining the active mode;
based on not receiving the second vice following the first voice while the remote controller is in the active mode of the critical time period, converting the active mode into the stand-by mode; and
based on receiving response information related to the first voice from the external display apparatus after converting the active mode into the stand-by mode, converting the stand-by mode into the active mode,
wherein, in the stand-by mode, a power is supplied to the communicator and power supply to the voice recognizer is blocked, and
wherein, in the active mode, the power is supplied to the communicator and the voice recognizer.

\* \* \* \* \*